United States Patent [19]
Tateisi et al.

[11] 3,754,747
[45] Aug. 28, 1973

[54] APPARATUS FOR WIDTHWISE CLAMPING WORKPIECES IN MACHINE TOOLS AND THE LIKE

[75] Inventors: Hiromiti Tateisi; Mituo Tamura, both of Iwata-shi, Sizuoka-ken, Japan

[73] Assignee: Toyo Bearing Manufacturing Company Limited, Osaka-shi, Japan

[22] Filed: May 5, 1971

[21] Appl. No.: 140,367

[30] Foreign Application Priority Data
Dec. 25, 1970 Japan.............................. 45/129784

[52] U.S. Cl.................... 269/20, 51/237 R, 269/25
[51] Int. Cl......................... B23q 3/08, B24b 41/04
[58] Field of Search.................. 269/20, 25, 27, 31, 269/30, 32; 279/4; 308/172, DIG. 1; 51/237 R

[56] References Cited
UNITED STATES PATENTS
3,574,974   4/1971   Weissing........................... 51/237 R
2,754,641   7/1956   Bidwell.......................... 308/DIG. 1
2,725,777   12/1955  Benson........................... 308/172 X Primary Examiner—James L. Jones, Jr.
Assistant Examiner—E. F. Desmond
Attorney—Hall & Houghton

[57] ABSTRACT

The present invention provides a method of and apparatus for widthwise clamping workpieces in machine tools and the like wherein a workpiece is rotatably supported between a clamp member on the stationary side and a clamp member on the movable side, the principal arrangement thereof being such that when there is no workpiece which is clamped, the clamp member on the movable side is supported in its centered state whereas when a workpiece is clamped, the clamp member on the movable side is spaced apart from a centering portion and is floatably supported by a hydrostatic bearing with respect to a pressure plate which provides a clamping force. The invention also provides methods of and apparatus for widthwise clamping workpieces in machine tools and the like comprising sub-arrangements based on said principal arrangements. Advantages and details in arrangement will be made clear.

3 Claims, 3 Drawing Figures

Patented Aug. 28, 1973

3,754,747

HIROMITI TATEISI,
MITUO TAMURA,
INVENTORS

BY Hall & Houghton
Attorney

3,754,747

APPARATUS FOR WIDTHWISE CLAMPING WORKPIECES IN MACHINE TOOLS AND THE LIKE

BACKGROUND OF THE INVENTION

1. Field of the Invention

The present invention relates to a method of and apparatus for widthwise clamping workpieces in machine tools and the like.

Generally, when a workpiece is to be widthwise clamped for machining of the inner or other surface or both, it is necessary that the clamp member on the stationary side (usually, the main shaft side where rotation is imparted to the workpiece), the workpiece and the clamp member on the movable side be supported in their set relative position so as not to become eccentric. Further, when a workpiece is to be widthwise supported, it is desirable that the clamp member on the movable side have a support construction such that it contacts and presses the end surface of a workpiece with a uniform clamping force, e.g., it has an aligning action.

2. Field of the Prior Art

As for this type of conventional width clamp devices, one having a construction shown in FIG. 3 is known. Thus, a clamp 2 on the movable side is mounted in an air or oil hydraulic cylinder 3 in such a manner as to be axially movable with respect to a clamp 1 on the stationary side. The opposite end surfaces of a workpiece 4 are clamped by the two clamp members 1 and 2, and rotation of the clamp member 1 on the stationary side causes the clamp member 2 on the movable side along with the workpiece to be rotated within the cylinder. With this arrangement, however, the inner and outer peripheries of the workpiece are in metal-to-metal contact with the bearing parts of the cylinder 3, so that a suitable clearance for lubrication is required. As a result of such clearance the clamp member 2 on the movable side becomes eccentric with respect to its set position. As a result, when the work-piece 4 is clamped for machining, the clamp member 2 on the movable side is rotated in its pressed and contacted state while being eccentrically positioned within the cylinder 3, forming the cause of degradation of the accuracy of machining, vibrations and other drawbacks. Therefore, in order to avoid said eccentricity, use has heretofore been made of a shoe for supporting a workpiece, but such supporting means makes an efficient machining operation (e.g., simultaneous machining of inner and outer diameters) difficult. Further, since the clamp member 2 on the movable side is in metal-to-metal contact with the cylinder 3, the area of contact tends to become worn and heated, so that said drawbacks become more pronounced, thereby shortening the life of the parts. Further, in said construction, since the clamp member 2 on the movable side is mounted in the cylinder 3 in such a manner as to be movable only axially, in the case of a workpiece with the parallelism of its end surfaces being poor, it is impossible to press the end surfaces of such workpiece with a uniform clamping force to ensure close contact thereof.

SUMMARY OF THE INVENTION

The present invention relates to improvements in the prior clamping method and apparatus in view of the abovementioned drawbacks. An object of the invention is to provide a clamping method wherein when there is no workpiece which is clamped, a clamp member on the movable side is supported in its centered state whereas when a workpiece is clamped, the clamp member on the movable side is spaced apart from a centering portion and is floatably supported with respect to a pressure plate which exerts a clamping force, and to provide an apparatus which embodies said method.

Another object is to provide a method which ensures eccentricity-free clamping of a workpiece, uniform distribution of a clamping force over a workpiece and self-alignment of a clamp member with respect to a workpiece, and an apparatus which embodies said method.

BRIEF DESCRIPTION OF THE DRAWING

In the accompanying drawing.

DESCRIPTION OF THE PREFERRED EMBODIMENT

Figure 1:
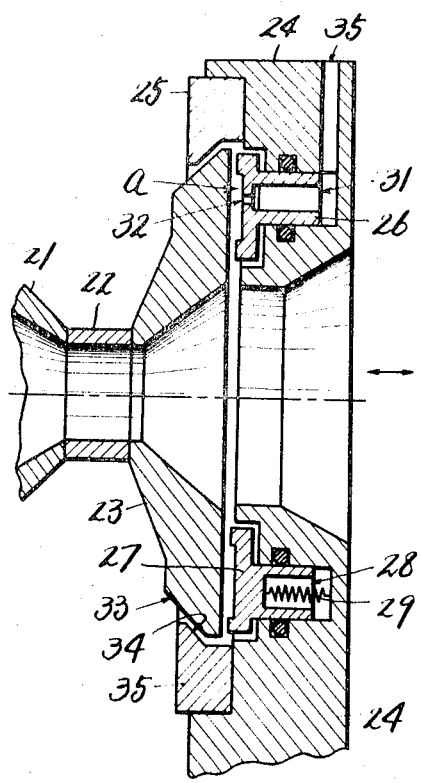
FIG. 1 is a side view in longitudinal section of an apparatus according to the invention.
Figure 3:
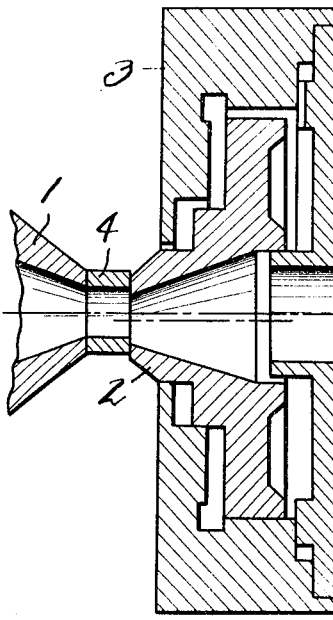
FIG. 3 is a longitudinal section of a conventional apparatus.

In FIG. 1, the numeral 21 denotes a clamp member on the stationary side such as a backing plate connected to a rotatable main shaft, which clamp member, though rotable, does not move axially. The numeral 22 denotes a workpiece and the numeral 23 denotes a clamp member on the movable side opposed to said stationary-side clamp member, and inserted in a chamber defined by a support main body 24 and a cover body 25, with suitable axial and radial clearances therebetween. Further, the support main body 24 is adapted to be axially reciprocated by suitable drive means. A cylindrical pressure piston 26 mounted for axial slide movement in the support main body 24 is formed at the front region thereof with an annular pressure plate 27 integral therewith and opposed to the rear surface of the clamp member. Further, it has a plurality of spring receiving recesses 28 equidistantly spaced apart from each other on the rear surface of the piston springs 29 constantly urge the movable-side clamp member 23 through the pressure piston 26 to establish contact between the centering surfaces of the pressure piston 26 and clamp member 23. In this connection, instead of the spring, use may be made of fluid pressure or resilient members or means equivalent thereto to constantly urge the movable-side clamp member 23 through the pressure piston to establish contact between the centering surfaces thereof.

The surface of the pressure plate 27 opposed to the movable-side clamp member 23 is provided with a plurality of fan-shaped recessed chambers 30 each being bored with a small hole 32 communicating with the rear chamber 31 of the pressure piston 26, with oil under pressure supplied to constitute a hydrostatic bearing part $a$. The centering surface of the front outer periphery of the movable-side clamp member 23 and the centering surface of the inner periphery of the cover body 25 supporting the same are in the form of parallel tapered centering surfaces 33 and 34, constituting the centering surface part of the movable-side clamp member 23. In this connection, the centering surfaces 33 and 34 may not be tapered surfaces provided that they are parallel surfaces.

FIG. 1 shows a state in which the workpiece 22 is clamped. But when there is no workpiece which is clamped during operation, the support main body is retracted to the right as viewed in the same Figure and no oil pressure is acting on the rear surface of the pressure plate 27, so that the movable-side clamp member 23 is urged forwardly, i.e., to the left as viewed in the same Figure by the springs 29 through the pressure piston 26, causing the tapered centering surface 33 of the movable-side clamp member 23 to be closely contacted with the tapered centering surface 34 of the cover body 25, thereby establishing a centered state. In this connection, at the time of clamping, the rear chamber 31 of the pressure piston 26 is supplied with oil under constant pressure from a suitable source of oil, e.g., an accumulator connected to an oil hole 35 in the support main body 24.

At the time of clamping the workpiece 22, a suitable loading device loads the workpiece 22 at a set position in front of the stationary-side clamp member 21 and subsequently the support main body 24 is moved to the left as viewed in FIG. 1. In this case the movable-side clamp member 23 supported by the support main body 24 is advanced while being maintained in its centered state as established by the tapered centering surface 24 of the cover body 25 as described above, until the foremost end surface of said support member 23 abuts against the end surface of the workpiece 24, whereupon the support main body 24 is moved to the left as viewed in FIG. 1, so that the tapered centering surfaces 33 and 34 are spaced apart from each other. At the same time, oil pressure is supplied to the rear chamber 31 of the pressure piston 26, so that a constant clamping force due to the oil pressure is imparted to the movable-side clamp member 23 through the pressure piston 26.

Figure 2:
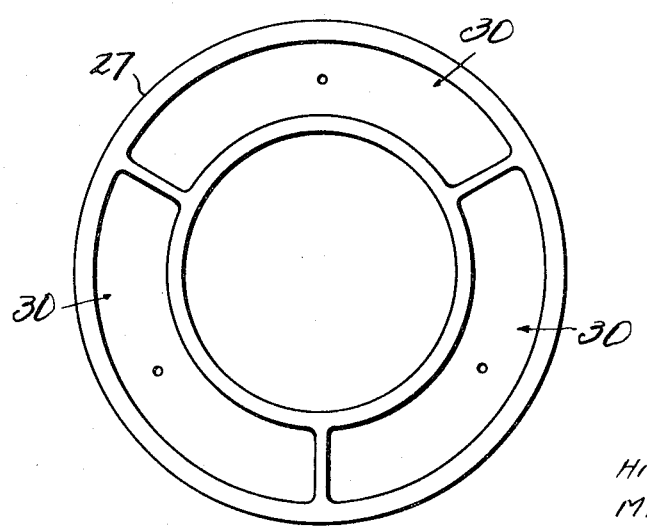
FIG. 2 is an end view of a pressure piston.

In this state, rotation is imparted to the stationary-side clamp member 21 to rotate the workpiece 24 for a predetermined machining operation. During this, the movable-side clamp member 23 is rotated with the tapered centering surfaces 33 and 34 spaced apart from each other. During this rotation, between the movable-side clamp member 23 and the pressure plate 27, the constant oil pressure in the rear chamber 31 of the piston 26 acts on the recessed chambers 30, so that the latter perform the function of a hydrostatic bearing. Particularly since the recessed chambers are formed to be separated from each other as shown in FIG. 2, an oil film is positively formed uniformly throughout the surface to ensure that the movable-side clamp member 23 is supported in the support main body in a floating non-contacting manner. In this connection even in cases where the parallelism of the end surfaces of the workpiece 22 is poor, it is to be noted that self-alignment is achieved because of said non-contacting floating support construction of the movable-side clamp member 23. Further, the movable-side clamp member 23 is supported with a uniform pressure distribution which is the greatest feature of the hydrostatic bearing, so that it retains a satisfactory clamping force no matter what posture it may assume, and the above-mentioned action of the movable-side clamp member 23 is further improved.

In the explanation given above, the supply of oil pressure is stopped when there is no workpiece which is clamped during operation. Therefore, the centering action of the movable-side clamp member 23 when there is no workpiece which is clamped during operation is effected solely by the springs 29. In this connection, the springs 29 also serve to control the posture of the movable-side clamp member 23 during stoppage of operation.

Apart from the method described above, according to the present invention it may be so arranged that constant oil pressure always acts on the pressure piston 26 regardless of whether or not there is a workpiece 22 which is clamped during operation.

In that case, the centering action of the movable-side clamp member 23 is effected by said oil pressure, and the springs 29 acting on the pressure piston 26 serve solely to control the posture of the movable-side clamp member 23 during stoppage of operation.

While there have been described herein what are at present considered preferred embodiments of the several features of the invention, it will be obvious to those skilled in the art that modifications and changes may be made without departing from the essence of the invention.

It is therefore to be understood that the examplary embodiments thereof are illustrative and not restrictive of the invention, the scope of which is defined in the appended claims and that all modifications that come within the meansing and range of equivalency of the claims are intended to be included therein.

We claim:

1. An apparatus for widthwise clamping workpieces in machine tools and the like wherein a workpiece is widthwise clamped between a stationary-side clamp means and a movable-side clamp member in such a manner that the workpiece is rotatable, characterized in that said apparatus comprises:
    a. a support member adapted to be reciprocated in the direction of clamping of the workpiece,
    b. a piston shiftable in said support member in said direction of clamping, and
    c. a movable-side clamp member movable in said support member forwardly of the piston in the direction of clamping and capable of tilted displacement,
    d. said clamp member and said support member comprising coacting centering surfaces operable when abutting each other for centering said clamp member in said support member,
    e. hydrostatic bearing means between said piston and said clamp member, and
    f. spring means for causing said centering surfaces to abut one another when said clamp member is not engaging a workpiece, said spring means permitting relative movement of said support and clamp member to move said centering surfaces to non-centering positon when said clamp member is clamping a workpiece.

2. An apparatus for width-wise clamping workpieces in machine tools and the like wherein a workpiece is widthwise clamped between a stationary-side clamp means and a movableside clamp member in such a manner that the workpiece is rotatable, characterized in that said apparatus comprises:
    a. a support member adapted to be reciprocated in the direction of clamping of the work-piece,
    b. a piston shiftable in said support member in said direction of clamping, and
    c. a movable-side clamp member movable in said support member forwardly of the piston in the direction of clamping and capable of tilted displacement, d. said clamp member and said support member comprising coacting centering surfaces operable when abutting each other for centering said clamp member in said support member,
e. hydrostatic bearing means between said piston and said clamp member, and
f. resilient pressing means for causing said centering surfaces to abut one another when said clamp member is not engaging a workpiece, said resilient pressing means permitting relative movement of said support and clamp member to move said centering surfaces to non-centering position when said clamp member is clamping a workpiece.

3. An apparatus as set forth in claim 2, wherein the surface of the piston opposed to the movable-side clamp member is formed with recessed chambers separated from each other to provide a hydrostatic bearing surface, said recessed chambers being acted upon by uniform fluid pressure, whereby the movable-side clamp member is floatably supported by a uniform clamping pressure throughout the area.

* * * * *